US012691711B2

(12) United States Patent
Owers

(10) Patent No.: US 12,691,711 B2
(45) Date of Patent: Jul. 28, 2026

(54) ADJUSTABLE DRAWBAR

(71) Applicant: Systematics Limited, Hamilton (NZ)

(72) Inventor: Raymond Owers, Hamilton (NZ)

(73) Assignee: Systematics Limited, Hamilton (NZ)

( * ) Notice: Subject to any disclaimer, the term of this patent is extended or adjusted under 35 U.S.C. 154(b) by 387 days.

(21) Appl. No.: 18/267,753

(22) PCT Filed: Dec. 17, 2021

(86) PCT No.: PCT/NZ2021/050226
§ 371 (c)(1),
(2) Date: Jun. 15, 2023

(87) PCT Pub. No.: WO2022/131937
PCT Pub. Date: Jun. 23, 2022

(65) Prior Publication Data
US 2024/0001723 A1 Jan. 4, 2024

(30) Foreign Application Priority Data

Dec. 18, 2020 (NZ) ......................................... 771332

(51) Int. Cl.
B60D 1/155 (2006.01)
B60D 1/44 (2006.01)
(52) U.S. Cl.
CPC ............... B60D 1/155 (2013.01); B60D 1/44 (2013.01)
(58) Field of Classification Search
CPC .................................................... B60D 1/155
See application file for complete search history.

(56) References Cited

U.S. PATENT DOCUMENTS 1,375,056 A * 4/1921 Mcminn ................ B60D 1/155
267/72
2,309,850 A * 2/1943 Klawitter ................. B60D 1/02
280/491.2
(Continued)

FOREIGN PATENT DOCUMENTS

BE 1001959 A5 4/1990
CN 211222929 U 8/2020
(Continued)

OTHER PUBLICATIONS

WO 2022/131937 International Search Report (ISR) published Aug. 23, 2022.

Primary Examiner — Kevin Hurley
(74) Attorney, Agent, or Firm — Ted Whitlock; 500Law

(57) ABSTRACT

An adjustable drawbar for a towed vehicle, such as a trailer, which allows it to be connected to a towing vehicle. It includes a hollow member which is configured with an opening along a surface and slidably receives an extension member. The extension member includes a guide which is dimensioned to be received by the opening. When the extension member is axially rotated in a first direction, the guide is engaged with the hollow member and prevents slidable movement. When the extension member is axially rotated in a second direction, the guide is disengaged from the opening and slidable movement is permitted. In this manner, the length of the drawbar may be adjusted as required, for example, to reduce the overall footprint of the trailer when being stored in a confined area.

13 Claims, 5 Drawing Sheets

(56) References Cited

U.S. PATENT DOCUMENTS

| | | | | |
|---|---|---|---|---|
| 2,667,366 | A | * | 1/1954 | Otjen .................... B60D 1/155 |
| | | | | 280/416 |
| 2,693,368 | A | | 11/1954 | Petron |
| 3,116,076 | A | | 12/1963 | Zingsheim |
| 3,169,782 | A | | 2/1965 | Columbus |
| 3,361,446 | A | | 1/1968 | Jeffes |
| 3,981,517 | A | | 9/1976 | Crochet, Sr. |
| 5,382,042 | A | | 1/1995 | McPhee et al. |
| 2007/0138760 | A1 | * | 6/2007 | Granzow .............. B60D 1/143 |
| | | | | 280/491.2 |
| 2007/0235982 | A1 | * | 10/2007 | Cumbie .................. B60D 1/42 |
| | | | | 280/478.1 |
| 2012/0001403 | A1 | | 1/2012 | Wydner |

FOREIGN PATENT DOCUMENTS

| | | | | | |
|---|---|---|---|---|---|
| DE | 4142485 | A1 | | 7/1993 | |
| EP | 2524860 | B1 | * | 6/2014 | .......... B60D 1/1675 |
| EP | 3476629 | A1 | | 5/2019 | |
| WO | WO-2022023300 | A1 | * | 2/2022 | .............. B60D 1/66 |

* cited by examiner

ADJUSTABLE DRAWBAR

FIELD OF INVENTION

The present invention relates to an adjustable drawbar for use with towed vehicles, such as trailers. In particular, the present invention relates to extendable/retractable drawbars.

BACKGROUND TO THE INVENTION

A drawbar is an attachment assembly connecting a towed vehicle, such as a trailer, to a towing vehicle such as a car, utility vehicle, truck or the like. A drawbar is attached to or integrally formed with the chassis of the towed vehicle and is configured with a coupling to receive or otherwise engage with the tow ball or pintle hitch of a towing vehicle.

Drawbars are known to be configured to allow extendable and/or retractable movement. This is useful for alleviating the problem of positioning a towing vehicle in close enough proximity to be attached to the towed vehicle. Often space available for correcting a misalignment between towing vehicle and towed vehicle is limited. Being able to extend and/or retract the drawbar may be helpful in quickly achieving the desired alignment and enabling connection between the towing and towed vehicles.

Having an adjustable drawbar can also assist in circumstances where a trailer may be carrying an elongated load that extends forward of the bounds of the trailer deck. In this situation, the drawbar may be extended to increase clearance between the trailer and the towing vehicle. Providing a retractable draw bar also allows the possibility of creating a smaller footprint for the towed vehicle, allowing for it to be stored in smaller confines when not in use.

Such drawbars are typically constructed from metal materials, extruded in a tube-like form, configured with an exterior portion having a square or round profile with an interior portion that is a slidable insert of compatible profile. The slidable insert is configured to extend and retract in a longitudinal direction, the purpose of which is to provide additional length or clearance between the towing vehicle and towed vehicle. The slidable insert is typically secured relative to the exterior length with a locking pin which may be completely removable or alternatively, spring-loaded. An example of such an arrangement is disclosed in German Patent Application No. 4142485.

However, there are disadvantages with these adjustable drawbars. For example, relatively precise alignment is required to pass the locking pin through the apertures of the exterior and interior portions of the drawbar. This may be exacerbated for certain types of towed vehicles, for example boat trailers. When attempting to couple a boat trailer to a towing vehicle in rough moving water or surf conditions, the ease of lifting or removing locking pins, such as those used in DE4142485, to adjust the length of the drawbar can be impaired. In rough and often cold water, fiddling with locking pins can be difficult, frustrating, and potentially dangerous.

Although removable locking pins are typically attached to the drawbar with a chain so as not to be lost, it is not uncommon for them to slip from a person's grasp. Spring loaded pull-up type locking pins can be difficult to grip. Corrosion, oxidation and issues with deposits forming on the metal components of the drawbar, particularly when used for boat trailers in seawater, can restrict the free movement of locking pins over time.

Objection of the Invention

It is an object of the invention to provide an adjustable drawbar for use with a towed vehicle, that may include a trailer, where the drawbar is easy to move from an extended to a retracted condition and back again.

It is a further object of the invention to provide a drawbar for use with a towed vehicle that provides the user with the ability to adjust the overall footprint of the towed vehicle.

At the very least, it is an object of the invention to at least provide the public with a useful choice.

SUMMARY OF THE INVENTION

According to one aspect of the invention, there is provided an attachment for a vehicle to be towed by a towing vehicle, the attachment including:

a hollow member having an elongate dimension and configured to be attached to the chassis of the vehicle to be towed;

an extension member having an elongate dimension and configured to be slidably received within the hollow member, wherein the extension member includes, at or proximate an end, a coupling configured to mate with a complementary coupling of the towing vehicle, characterised in that the extension member includes a guide extending transversely from the elongate dimension of the extension member, and wherein the hollow member includes at least one opening substantially complementary to the guide, and wherein the extension member is configured to be axially rotatable relative to the hollow member, and wherein the guide and opening are arranged to limit the axial rotation of the extension member.

According to another aspect of the invention, there is provided a vehicle to be towed by a towing vehicle, wherein the towed vehicle is configured with a chassis including:

a hollow member having an elongate dimension;

an extension member having an elongate dimension and configured to be slidably received within the hollow extrusion member, wherein the extension member includes, at or proximate an end, a coupling configured to mate with a complementary coupling of the towing vehicle, characterised in that the extension member includes a guide extending transversely from the elongate dimension of the extension member, and wherein the hollow member includes at least one opening substantially complementary to the guide, and wherein the extension member is configured to be axially rotatable relative to the hollow member, and wherein the guide and opening are arranged to limit the axial rotation of the extension member.

The invention is an apparatus, henceforth referred to as an adjustable drawbar, which is a coupling assembly connecting a towed vehicle to a towing vehicle. The adjustable drawbar may be part of the towed vehicle or alternatively provided to the user as an attachment to be mounted to a vehicle that has been suitably modified, for example, by removing at least a portion of the existing drawbar.

The drawbar of the present invention has applications that may include, but are not limited to, use with single and/or multiple axle trailers hauled by a towing vehicle, such as a car, utility vehicle, truck or other heavy vehicle. Such trailers, which may include utility trailers, furniture trailers, horse floats, boat trailers and so on, are typically used for transporting heavy loads. In some embodiments, the towing vehicle may be an all-terrain vehicle or ride-on mower; in these embodiments, the trailer may be a garden trailer or the like.

In exemplary embodiments, the drawbar will be understood to comprise of at least two components, consisting of a hollow member and an extension member, which is slidably received by the hollow member. The hollow member and extension member should be understood to have an elongate dimension.

In some embodiments, the hollow member may in turn be received by a third member; this may be a part of the chassis of the trailer, or a separate structure which is in turn attached to the chassis of the trailer.

In exemplary embodiments, the hollow member and extension member are constructed or otherwise fabricated from metal. The metal used is typically steel, stainless steel or may alternatively be aluminium or alloy. Alternatively, they may be formed from fibre reinforced polyester or similar plastics materials.

In exemplary embodiments, the hollow member and extension member may be formed as machined or forged extrusions or mouldings engineered to the appropriate industrial standard for the end use of the trailer. Alternatively, they may be stamped from metal sheet, subject to appropriate industry standards.

In exemplary embodiments, the hollow member and extension member are formed from hollow extrusions of circular shaft metal tubing. In alternative embodiments the hollow member may be formed from extrusions of hollow, rectangular shaft metal tubing and assume a substantially square, rectangular or circular cross-section.

In exemplary embodiments the extension member is circular in cross section and hollow. However, in alternative embodiments the extension member may not be hollow, but rather a solid tube. This may add to the weight of the vehicle when in use and increase cost of manufacture.

The extension member is complementary in diameter to the hollow member so as to be slidably received by the hollow member. It will be appreciated that the extension member has an exterior surface that may contact the interior surface of the hollow member. In some examples, an appropriate clearance may be provided between the extension member and the hollow member to enable the use of a low friction liner to be applied to one or both of the exterior surface of the extension member or the interior surface of the hollow member.

In preferred embodiments the hollow member may be an integral part of the chassis of the towed vehicle. In alternative embodiments, the hollow member may be an attachment that is configured to be attached to the chassis of the towed vehicle. The means of attachment may be fixed, for example, with welded joints. Alternatively, the means of attachment may include bolts, screws, pins, rivets or the like. It will be appreciated that these means of attachment are described by way of example and are not meant to be limiting. Persons skilled in the art will appreciate that other means of attachment may be available, depending on the preferences of the manufacturer.

In other alternative embodiments the hollow member may be configured with a coupling or similar structure that allows for the hollow member to be removably attached to the towed vehicle such that the drawbar can be fitted when needed and removed for alternative storage when not.

As noted above, the hollow member receives the extension member of the present invention. Essentially, the hollow member serves as a housing for the extension member.

It will be understood that the extension member is able to slidably move along the elongate dimension of the hollow member for at least a portion of its length. This allows the drawbar to be increased or decreased in length as required. Persons skilled in the art will appreciate that the invention is engineered such that when in an extended state, the mechanical strength afforded by the respective hollow member and extension member is sufficient to comply with the necessary industry standards.

The extension member is also able to axially rotate within the hollow member; when it is axially rotated in a first direction the guide engages with the opening, thereby preventing slidable movement of the extension member relative to the hollow member and when it is axially rotated in a second direction, the guide disengages from the opening, to allow slidable movement of the hollow member.

In exemplary embodiments of the invention the extension member is configured to be attached to the towing vehicle by means of an appropriate coupling such as a coupling/hitch cap compatible with a towing vehicle tow ball. This is not meant to be limiting, and by way of a non-limiting example, in alternative embodiments of the invention, the coupling may be a pintle hook if this is compatible to the tow bar fitted to the towing vehicle. Typically, such couplings will include a locking system and safety chain. In other embodiments the extension member may be configured with a custom or purpose designed coupling system in order to be compatible with a towing vehicle.

The extension member is configured with a guide extending outwards, transverse from the elongate dimension. The guide may be thought of as an upright tongue or flange and shall be referred to as such throughout the remainder of this specification.

In exemplary embodiments, the extension member may be provided with at least two tongues, each tongue on an opposing side of the extension member.

In exemplary embodiments the tongue may assume a triangular profile. Alternatively, the tongue may be an upright square or rectangular profile.

In exemplary embodiments, the tongue is attached to the extension member by welded joints or other similar bonding method. Alternatively, the extension member and tongue may be formed as a single moulded, forged or extruded piece. In other embodiments the tongue may be a separate structure connected by fastening means such as bolts, screws, pins, rivets or the like. Persons skilled in the art will appreciate that the tongue will need to be engineered to the appropriate industrial standard given the likely forces that will be applied to the trailer when being towed in an empty or laden state.

The hollow member is configured with an opening which, in use, defines a receptacle to receive and guide the tongue of the extension member. As previously noted, the extension member is configured to be slid and axially rotated (i.e. rotated in a direction transverse or perpendicular to its longitudinal axis) or twisted such that the tongue then inserts into the opening and is thus locked into position until the extension member is rotated and slid in the opposing direction. Persons skilled in the art will appreciate that the opening of the hollow member needs to be substantially complementary to the dimensions of the tongue of the extension member. However, it should also be dimensioned to allow clearance for the tongue as it is rotated in and out of engagement with the opening. This may depend on the extent to which the tongue extends away from the extension member.

In some embodiments, a shroud or housing extending upwards and away from the hollow member may be provided to partly or fully cover the openings. In one example, the shroud or housing is partially open and may be arranged on the side of the opening facing the towing vehicle, i.e. direction of travel. This may be helpful in minimising ingress of water and detritus into the opening, potentially affecting the operation of the invention, while still allowing the user to see the opening of the hollow member as they operate the invention.

It should be appreciated that when the drawbar is attached to the tow bar, an integral part of the towing vehicle, the extension member is not able to be rotated back in the opposing direction. The coupling prevents it from doing so while the tongue remains engaged with the opening to prevent the extension member from sliding within the hollow member. Thus, the drawbar remains locked and the extended length of the drawbar remains fixed while attached to the towing vehicle.

In preferred embodiments, the axial rotation is through approximately 45°. This is preferred for embodiments in which the extension member has a circular profile and the hollow member has a square profile as it provides clearance for rotation of the extension member from a locked or engaged condition into an unlocked or disengaged condition, where the tongue has been placed into the corner of the hollow member, thus permitting slidable movement of the extension member.

However, in some embodiments, the axial rotation may be greater than this; persons skilled in the art will appreciate that the opening will need to be located appropriately and furthermore, the profiles of the respective extension member and hollow member must also be considered.

Preferably the opening is located on the top or superior surface of the hollow member, partway along the elongate length. Alternatively, the opening may be provided to a side of the hollow member. This makes the tongue and its interaction with the opening readily visible to the user when connecting the vehicle to be towed to the towing vehicle.

In some embodiments, the surface of the extension member may include markings indicative of the relative position of the tongue; in use, when the moving the extension member within the hollow member, the markings may be visible through the opening of the hollow member and provide an indication to the user as to the approximate location of the tongue.

In exemplary embodiments, the hollow member may be provided with at least two openings, each opening on an opposing side of the extension member. A first opening may be provided to the top surface of the hollow member, and a second opening may be located on the inferior surface of the hollow member, partway along the elongate length (or alternatively the respective sides of the hollow member). In this example, it will be appreciated that the extension member is provided with at least two tongues, one for each of the openings of the hollow member.

In exemplary embodiments the opening is a substantially rectangular or square slot extending from proximate the centre of the hollow member toward one side. The corresponding opening on the inferior surface may extend from proximate the centre toward the opposing side of the hollow member.

It will be appreciated that the location of the opening along the elongate length of the hollow member determines the length to which the extension member can be extended.

In some embodiments of the invention, the hollow member may be configured to include multiple openings along the elongate length, thus defining multiple lengths for the extension member. In other embodiments, there may or may not be a series of multiple corresponding openings on the inferior surface of the hollow member.

In other embodiments, the size of the tongues may be increased or decreased dependent upon the size of the corresponding opening. In further embodiments the drawbar may be configured to include a multiple number of tongues to correspond with a multiple number of openings to provide additional strength to the drawbar when in a locked position.

In embodiments where both the extension member and the extension insert are configured to be tubes of circular cross-section, the opening in the extension member which defines a receptacle to receive the tongue of the extension insert may extend at an angle of 90° to the initial opening, along the elongate length of the extension member such that the opening forms an L shape.

In alternative embodiments the opening in the hollow member includes additional structures to increase the potential contact surface between it and the tongue. For example, in some embodiments, the opening may be configured to include a small plate extending away from the hollow member and at an angle substantially 90° to the tongue when inserted. This plate acts as a backstop to provide additional locking support to the opening when the tongue is inserted or otherwise engaged. Preferably the backstop plate is constructed from the same metal material as the hollow member and is attached by means of welded joints. However, it should be appreciated that other attachment means such as bolt, pins, screws, rivets or the like may be used.

The use of co-operative openings and tongues is a much less fiddly mechanism for a user to operate compared to prior art devices for facilitating the adjustment of the length of the drawbar in use. There are no spring-loaded bolts or the like that need to be manipulated.

In preferred embodiments, the means of adjusting, extending, retracting and twisting the drawbar is by manual means by the operator. In use, this is best practically achieved by gripping the handle of the tow coupling and rotating and/or pulling on it as required. In other embodiments the means of adjustment may be by a mechanical system operated by electrical, hydraulic or pneumatic actuation readily implemented by persons skilled in the art. Preferably in such embodiments, the energy to operate a non-manual adjustment system would be provided by an electric battery, which would be recharged from an alternator or solar cells within the towing vehicle, or within the towed vehicle. Alternatively, the energy may be provided by an appropriate external source.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF PREFERRED
EMBODIMENTS OF THE INVENTION

Figure 1:
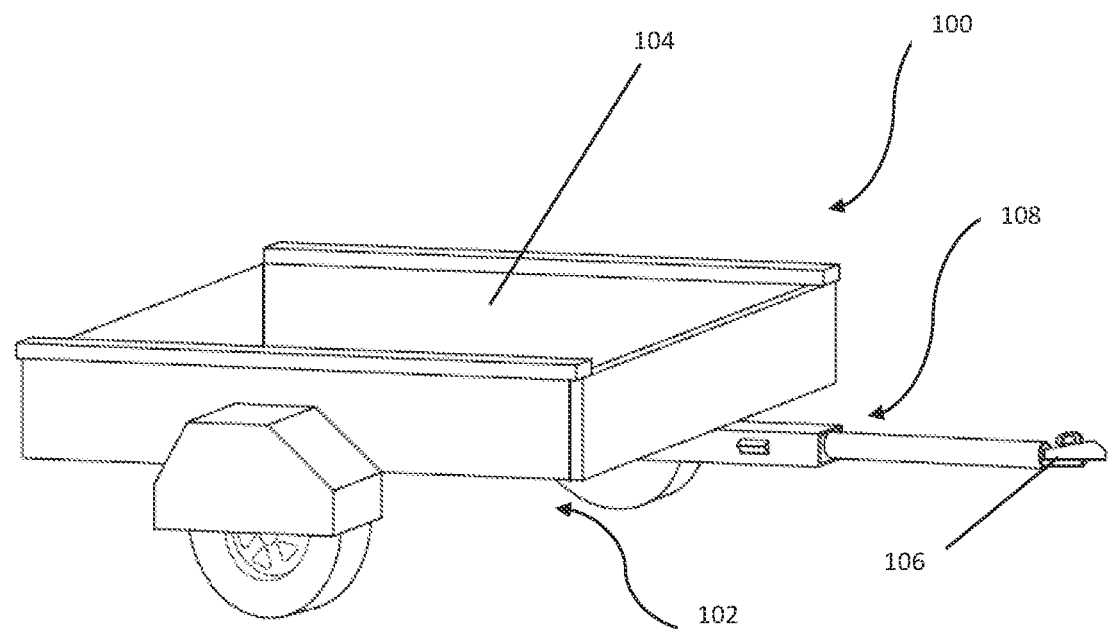
FIG. 1 is a perspective view of a typical towed vehicle in the form of a common trailer, provided with one exemplary embodiment of the invention in the form of an extendable drawbar.

For the purpose of understanding the invention, FIG. 1 depicts a typical towed vehicle (generally indicated by arrow 100) in the form of a common single-axle trailer, widely used for transporting household items and loads. While the following discussion is in respect of a single-axle trailer it should be appreciated that the principle of the invention may be readily applied to trailers having single or multiple axles including, and without limitation, horse floats, furniture trailers, caravans, boat trailers and so on.

The trailer (100) comprises a chassis (102), and a compartment (104) for carrying a load. The chassis is provided with a tow coupling/hitch (106).

As can be seen, the tow coupling (106) is provided to an end of the invention, which is an extendable drawbar (108), itself part of the chassis (102) of the trailer (100). It should be appreciated that the drawbar can add substantially to the overall footprint of the trailer. This can be problematic for storing of the trailer when not in use. The present invention, as discussed in respect of the following figures, is useful in temporarily allowing the footprint of the trailer to be reduced.

This is achieved by changing the length of the drawbar (108) of the trailer (100) from an "in-use" configuration, i.e. being towed, as it would appear in FIG. 1, to a "stored" configuration when the length of the drawbar has been reduced.

Figure 2:
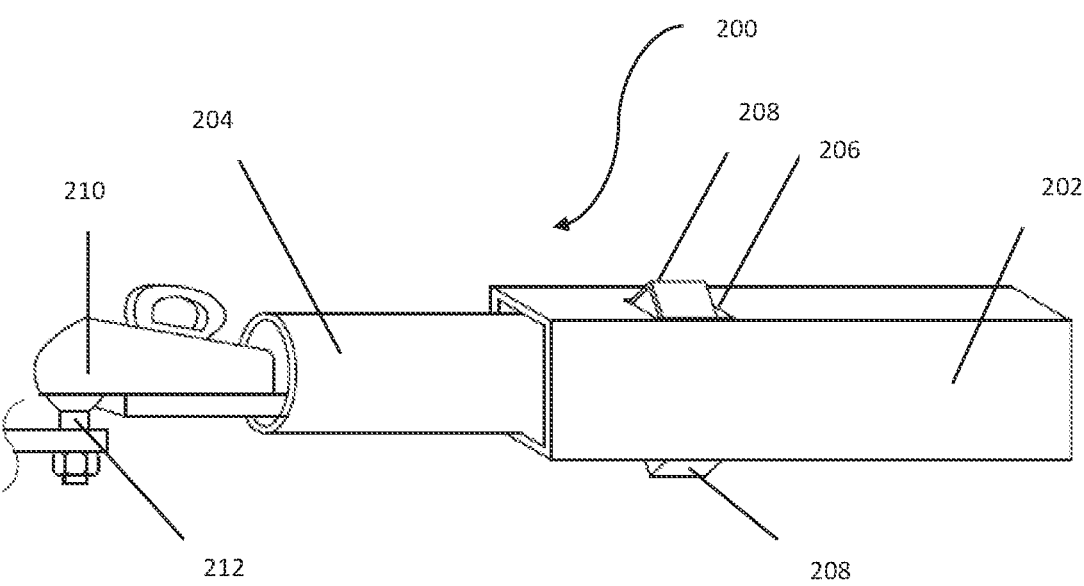
FIG. 2 is a side perspective view of another exemplary embodiment of the invention, showing the extendable drawbar in an extended and locked position where the hollow member is configured with a square cross-section and the extension member is configured with a circular cross-section.

FIG. 2 depicts another exemplary embodiment of the invention in the form of an extendable drawbar (200) from a side perspective view in an extended and locked position. The drawbar is configured to include a hollow member (202) with a square or box cross-section and the extension member (204) with a circular cross-section. In this embodiment, the hollow member is an integral part of the chassis of the trailer (not shown) to which it is fitted. However, in other examples not illustrated here it may be a separate structure that is welded or otherwise mated with the drawbar of the trailer to which it is fitted. This may require a portion of the existing trailer drawbar to be removed.

The hollow member (202) is configured with an opening (206) on its top side with a corresponding opening (not visible) on its lower side. Having, the opening facing upwards is helpful since it is readily observed by the user of the drawbar when fitting the coupling (210) at the end of the drawbar (200) of the trailer to the tow ball (212) of the towing vehicle (not shown). However, in some embodiments, such as that of FIG. 1, openings may be provided to the sides of the hollow member.

The extension member (204) is shown to be configured to include a pair of tongues (208) able to be received by the openings (206). The use of paired openings and tongues provides additional structural integrity when engaged. It should be noted that although not shown here, there would be a further pair of tongues and openings disposed closer to the trailer end of the chassis; the distance between the respective pairs of openings demarcate the length to which the extension member is able to be adjusted relative to the hollow member (202).

Figures 3A, 3B:
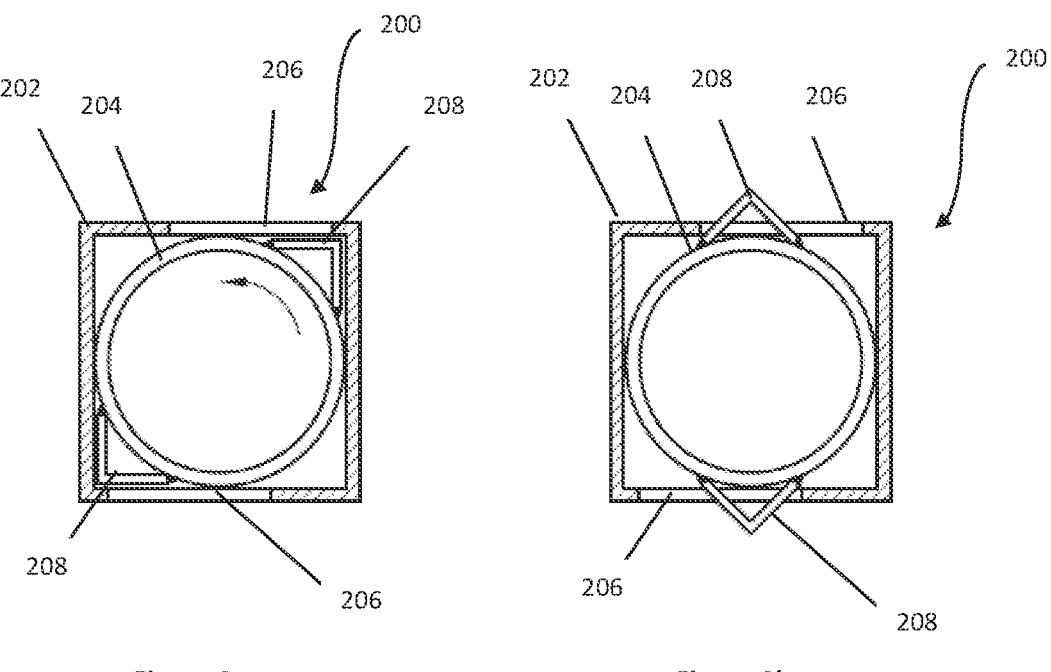
FIG. 3a is a cross-sectional view of the embodiment of the invention of FIG. 2 showing the tongues of the extension member in an un-engaged position with the hollow member, able to slide within the confines of the hollow member.
FIG. 3b is a cross-sectional view of the embodiment of FIGS. 2 and 3 showing the tongues of the extension member engaged with the openings of the hollow member.

The extension member (204) is axially rotatable within the hollow member (202). For example, when rotated in a first direction, the tongues (208) are moved into the right-angle corner of the hollow member as shown in FIG. 3a. The extension member can then be moved longitudinally along the length of the hollow member. In this manner, the drawbar (200), with its tow coupling (not shown in this view) can be extended or retracted as desired.

To lock the drawbar in a desired position, the extension member (204) is moved lengthways such that the tongues (208) are opposite the openings (206) of the hollow member (202). The extension member is then axially rotated by at least 45°. This brings the tongues into engagement with the openings of the hollow member, as shown in FIG. 3b. Similarly, the pair of tongues (not shown) and openings (not shown) closer to the rear of the drawbar (200) proximate the trailer (not shown) engage with each other. Collectively, the tongues and openings act as a stop to prevent longitudinal movement of the extension member. The extension member is fixed or locked into position at a set extended length, determined by the position of the openings along the length of the drawbar (200) and can no longer slide within the hollow member unless the extension member is turned back through the approximate 45° in the opposing direction, thus moving the tongues out of the respective openings and back within the confines of the extension member.

Although only a single pair of openings (206) are shown in FIGS. 2, 3a and 3b, in some other embodiments of the invention, additional pairs of openings may be provided along the length of the hollow member. As will be appreciated, having multiple openings along the length of the drawbar provides the user of the invention with options for setting the overall length of the drawbar. In these examples, additional tongues may also be provided; this may help to distribute the towing forces in use.

Figure 4:
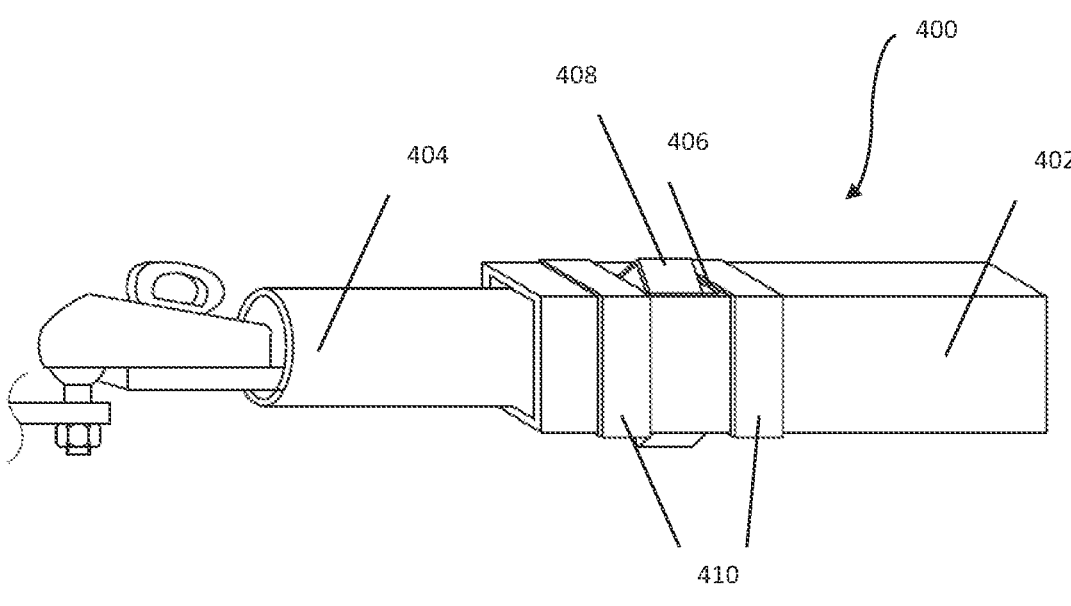
FIG. 4 is a side perspective view of an alternative embodiment of the invention in an extended and locked position with additional strength provided to the hollow member in the region of the openings.

Another embodiment (400) of the invention is shown in FIG. 4. This is much the same as previously described with a hollow member (402) serving as a housing for the extension member (404). The opening (406) of the hollow member co-operates with the tongues (408) of the extension member to set and lock the length of the drawbar. To increase the surface area and stiffness of the respective contact surfaces between the tongue and opening, collars (410) may be provided. These also serve to strengthen the structural integrity of the hollow member. While in this embodiment the collars wrap about the external surface of the hollow member, alternative embodiments may be provided with a plate, welded or otherwise secured to the respective top and bottom of the hollow member, for the same purpose. Similarly a curved cap-like structure (not shown) may be provided to partially cover the openings; the edges of the cap-like structure may be welded to a portion of the perimeter of the opening, which may help in increasing structural integrity in this area of the drawbar.

Figure 5:
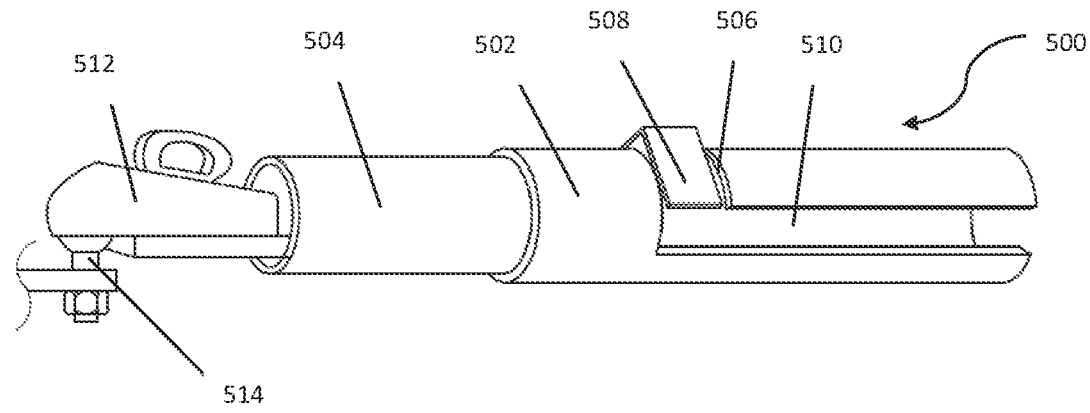
FIG. 5 is a side perspective view of an alternative embodiment of the invention where the extension member and hollow member are both configured with a circular cross-section.
Figure 6:
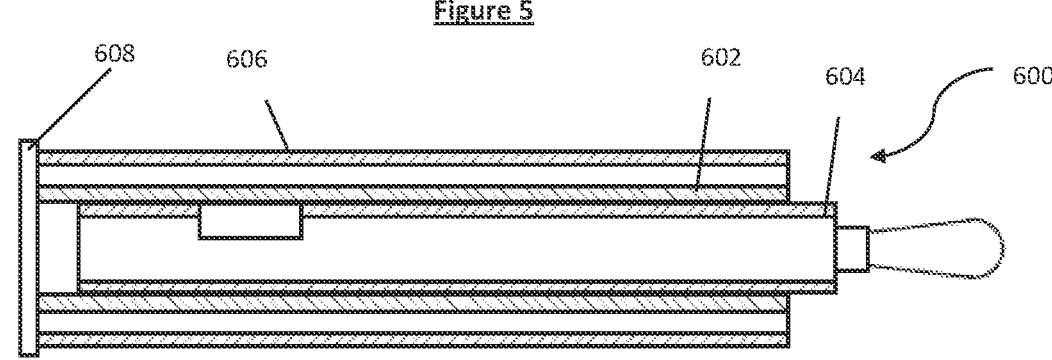
FIG. 6 is a top view of another alternative embodiment of the invention.

FIG. 5 depicts an alternative embodiment 500 of the invention from a side perspective view in an extended and locked position. Similar to previous embodiments described, the adjustable drawbar is configured to include a hollow member (502) and extension member (504), but with a circular cross-section.

The hollow member (502) is configured with an opening (506) which is transverse to and communicative with an elongate slot (510) running a portion of the length of the drawbar (500). The opening here is on the top side of the hollow member with the slot positioned on the side. It will be appreciated that the tongue of the extension member is guided along the slot till it reaches the opening at which point the extension member is axially rotated to bring the tongue into engagement with the opening.

Thus the extension member (504) is fixed or locked into position at a set extended length and can no longer slide within the hollow member (502). However, when axially rotated so the tongues (508) are guided into the elongate slot (510), the extension member can be retracted as required. It will also be appreciated although not visible in this view, the other end of the elongate slot (510) is provided with an opening so that the extension member may be locked into a retracted state, rather than the extended state as shown here. Additional openings may be provided along the length of the elongate slot to provide the user with options for setting the degree of extension of the drawbar (500).

The extension member (502) is prevented from further axial rotation when the coupling (512) is engaged with the tow ball (514) of the towing vehicle (not shown).

Alternative embodiments, not shown here, may be provided with a corresponding opening and elongate slot on the opposing side of the hollow member. Such an arrangement would permit the use of paired tongues.

A further alternative embodiment (600) of the invention is shown in FIGS. 6 to 9. In this embodiment, the hollow member (602) receives the extension member (604) and as with previous embodiments described, the latter is longitudinally slidable relative to the former. However, this embodiment differs in that the hollow member in turn is disposed within an exterior outer member (606). This outer member may form part of the chassis (not shown) or be a separate structure that is then attached to the chassis of the trailer. This increases the ability of the drawbar to be extended if required, such as in the scenario shown in FIG. 10.

This shows a trailer (1000) carrying a load (1002) that extends well forward and may contact the towing vehicle (not shown). The adjustable drawbar (600) potentially alleviates this by allowing the hollow member (602) to extended out of the outer member (606), shown here as part of the chassis of the trailer.

Returning to FIG. 6, it will be seen that the degree of retraction of the hollow member (602) is limited by a plate (608) provided to the outer member (606). Similarly, the degree of extension may be limited by a flange (not shown) provided to the end of the hollow member (602) which contacts a similar flange (not shown) provided to the open end of the outer member. The respective hollow member and outer member may be locked in place though the use of a bolt or locking pin (not shown) that is passed through apertures (not shown) provided to the respective components when correctly aligned.

In use, this embodiment (600) functions in much the same manner as described for previous embodiments. As per FIG. 7, the extension member (604) is axially rotated such that the tongues (610) are placed into the corners of the hollow member (602) and do not engage with the openings (612). This means that the extension member can be withdrawn or extended as required.

Figure 7:
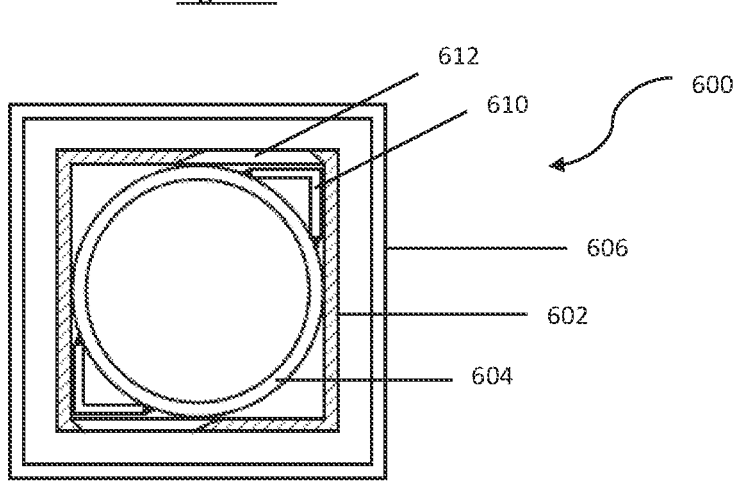
FIG. 7 is a cross-sectional view of the embodiment of FIG. 6.
Figure 8:
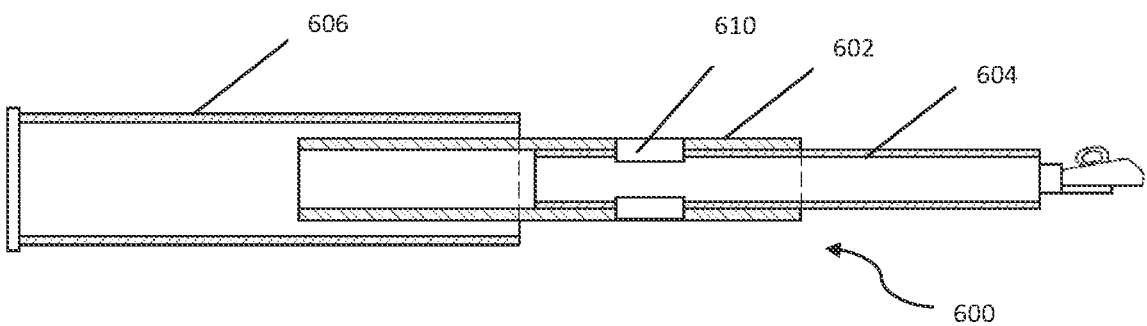
FIG. 8 is a further top view of the embodiment of FIGS. 6 and 7 in an extended and locked position.
Figure 9:
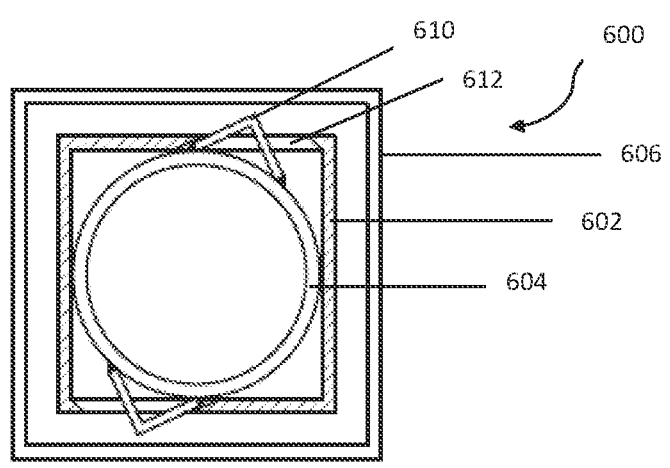
FIG. 9 is a cross-sectional view of the embodiment of FIG. 8 in an extended and locked position.
Figure 10:
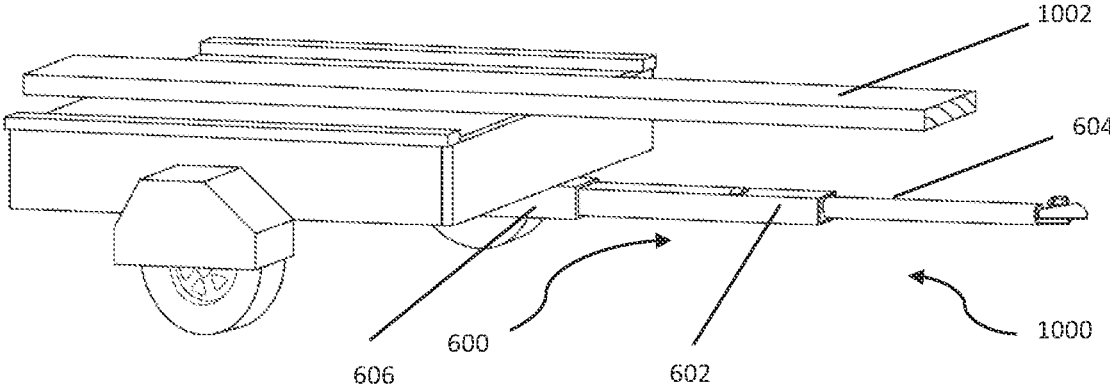
FIG. 10 is a perspective view of a common trailer provided with the embodiment of the invention shown in FIGS. 6 to 9.

In FIG. 8, the extension member (604) is shown in an extended state; it has been axially rotated, as per FIG. 9, such that its tongues (610) pass through the openings (612) and thus engage with the hollow member (602). This locks the extension member relative to the hollow member. However, the hollow member is still able to slidably move within the outer member (606) such that the drawbar can be further increased in length if desired. It should be appreciated that cross-sectional views FIGS. 7 and 9 are drawn slightly overscale to exaggerate the clearance between the hollow member and the outer member. In practice, these may have closer tolerances and in some examples, there may be low friction plates or surfaces provided to the respective contact surfaces to facilitate easier extension and retraction as required.

Figure 11:
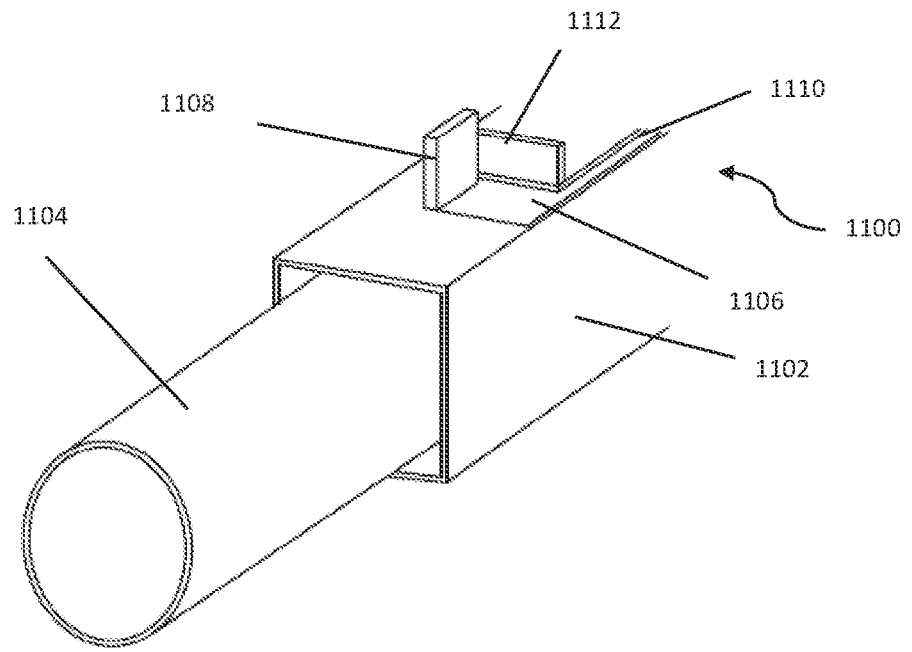
FIG. 11 is an end perspective view of yet another alternative embodiment of the invention in an extended and locked position showing an alternate tongue configuration and a backstop plate.

FIG. 11 is an end perspective view of yet another alternative embodiment (1100) of the invention in an extended and locked position, with the tow coupling omitted for sake of clarity. This is intended to show that the tongue may take different forms as will be apparent to a person skilled in the art.

The illustrated adjustable drawbar (1100) is shown with a hollow member (1102) having a rectangular cross-section co-operating with an extension member (1104) having a circular cross-section. The hollow member (1102) is provided with an opening (1106) on its upper surface and also evident in this view is an alternate tongue (1108) configuration for the extension member (1104). In the illustrated example, the tongue (1108) is in the form of a rectangular plate extending away, or transversely from, the elongate dimension of the extension member. Because of the use of a rectangular box section for the hollow member, this provides additional space and clearance for the tongue as it axially rotates.

Axial rotation of the tongue (1108) is limited by the edge of the opening (1106), which is also communicative with an elongate slot (1110) extending rearwards. As will be appreciated, when the extension member (1104) has been sufficiently rotated, the tongue is able to travel along the slot.

In contrast, the tongues (208) of, for example, the embodiment shown in FIG. 2 is configured as a triangular shaped structure extending away, or transversely from, the elongate dimension of the extension member (204). The triangular shaped structure may be formed from two small plates welded to each other along one edge to form the apex with the opposing ends welded to the extension member. Alternatively, it may be a one-piece right-angled extrusion which has been welded or otherwise connected at its free ends to the extension member.

Returning to FIG. 11, the opening (1106) of the housing (1102) is provided with a backstop plate (1112). This is located proximate the edge of the opening which is closest to the towed vehicle (not shown) and positioned perpendicular to the tongue (1108). It should be appreciated that the backstop plate provides additional surface area for the locking function of the tongue.

Figure 12:
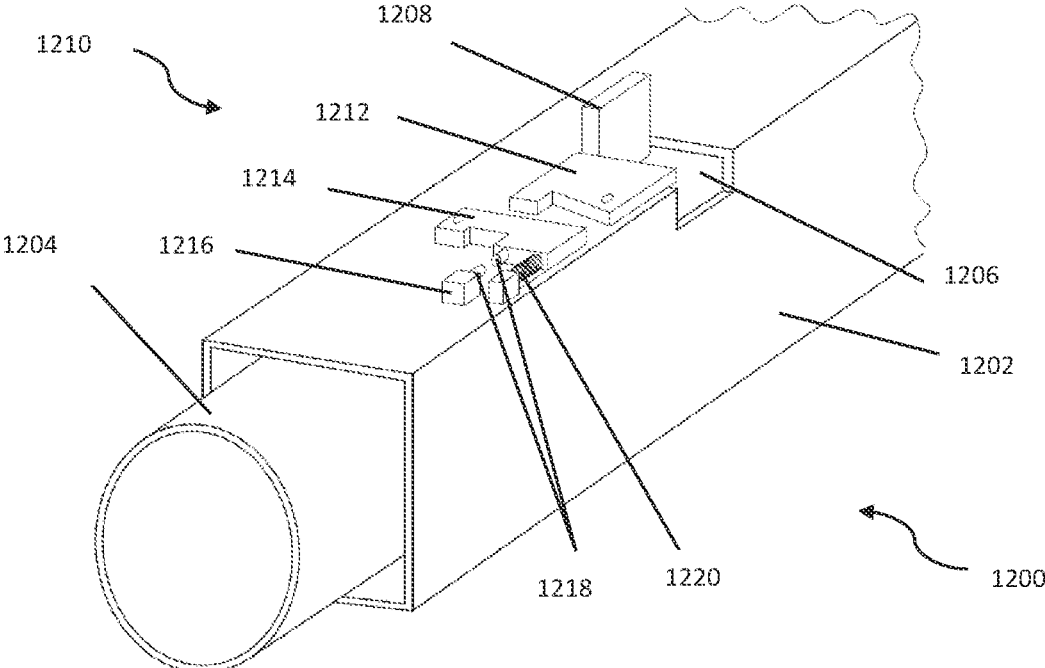
FIG. 12 is an end perspective view of yet another alternative embodiment of the invention in an extended and locked position showing a braking assist system for use with the present invention.

FIG. 12 shows yet another embodiment (1200) of the invention. Similar to previous embodiments, it includes a hollow member (1202) and an extension member (1204). The opening (1206) to the hollow member, which receives the tongue (1208), wraps around the edge of the hollow member; there is no elongate slot as with the embodiment of FIG. 11.

A basic braking assist system (1210), which helps transfer the forces imparted, when the towing vehicle brakes, from the adjustable towbar of the present invention to the brakes of the towed vehicle, i.e. the trailer (not shown), shall now be described in respect of the embodiment (1200) of FIG. 12. Such an arrangement may be desirable for larger trailers that are often provided with on-board braking systems.

Under braking, the tongue (1208) of the extension member (1204) is urged against a lever (1212) provided to the exterior surface of the hollow member (1202). This is turn rotatably pivots against a lever (1214) for a limit switch (1216), bringing together mutual contacts (1218). This then sends a signal to the trailer's braking system (not shown) to activate its brakes.

On cessation of the braking force, for example, when the towing vehicle (not shown) increases its speed, the tongue (1208) withdraws somewhat, and the lever of the limit switch, urged by a spring (1220), similarly withdraws. The breaks the contact between the lever of the limit switch and the limit switch itself, and the brakes of the trailer are deactivated. Although not shown in FIG. 12, it will be appreciated that the entire braking assist system may be covered by a housing or similar structure in practice.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. An attachment for a vehicle to be towed by a towing vehicle, the attachment including:

a hollow member having an elongate dimension and a substantially square cross-sectional profile, and wherein the hollow member is configured to be attached to the chassis of the vehicle to be towed;

a hollow extension member having an elongate dimension and a substantially circular cross-sectional profile, wherein the extension member is configured to be slidably received within the hollow member, wherein the extension member includes, at or proximate an end, a coupling configured to mate with a complementary coupling of the towing vehicle;

characterised in that the hollow extension member includes a guide extending transversely from the elongate dimension of the extension member, and wherein the hollow member includes at least one opening substantially complementary to the guide, and wherein the extension member is configured to be axially rotatable relative to the hollow member, and wherein the guide and opening are arranged to limit the axial rotation of the extension member, and wherein axial rotation of the hollow extension member in a first direction engages the guide with the opening to prevent slidable movement of the hollow extension member relative to the hollow member, and wherein axial rotation of the extension member in a second direction disengages the guide from the opening into a first right angle interior corner of the substantially square cross-sectional profile of the hollow member to permit slidable movement of the hollow extension member relative to the hollow member.

2. The attachment as claimed in claim 1, wherein the opening is provided to a top/superior or a bottom/inferior surface of the hollow member.

3. The attachment as claimed in claim 1, wherein the opening is provided to a side surface of the hollow member.

4. The attachment as claimed in claim 1, wherein a second opening is provided to an opposing surface of the hollow member.

5. The attachment as claimed in claim 4, wherein the hollow extension member is provided with a second guide that in use engages with the second opening to prevent slidable movement of the hollow extension member relative to the hollow member, and wherein axial rotation of the extension member in a second direction disengages the second guide from the second opening into a second right angle interior corner of the substantially square cross-sectional profile of the hollow member to permit slidable movement of the extension member relative to the hollow member.

6. The attachment as claimed in claim 1, wherein the guide has a triangular profile.

7. The attachment as claimed in claim 1, wherein the guide is an upright square or rectangular profile.

8. The attachment as claimed in claim 1, wherein the hollow extension member is configured to axially rotate at least approximately 45° to engage and disengage the guide from the opening of the hollow member.

9. The attachment as claimed in claim 1, wherein the opening of the hollow member is bounded along an edge with an upright plate.

10. The attachment as claimed in claim 1, wherein the guide is operative on an assisted braking system provided to the vehicle to be towed.

11. A method of using the attachment of claim 1, wherein the method includes the steps of:

a) rotating the hollow extension member in a first direction to engage the guide with the opening to prevent slidable movement of the hollow extension member relative to the hollow member, and b) rotating the extension member in a second direction to disengage the guide from the opening and into a first right angle interior corner of the substantially square cross-sectional profile of the hollow member to permit slidable movement of the hollow extension member relative to the hollow member.

12. A vehicle to be towed by a towing vehicle, wherein the vehicle to be towed is configured with a chassis, the chassis including:

a hollow member having an elongate dimension and a substantially square cross-sectional profile;

a hollow extension member having an elongate dimension and a substantially circular cross-sectional profile, and wherein the hollow extension member is configured to be slidably received within the hollow member, wherein the hollow extension member includes, at or proximate an end, a coupling configured to mate with a complementary coupling of the towing vehicle;

characterised in that the hollow extension member includes a guide extending transversely from the elongate dimension of the hollow extension member, and wherein the hollow member includes at least one opening substantially complementary to the guide, and wherein the hollow extension member is configured to be axially rotatable relative to the hollow member, and wherein the guide and opening are arranged to limit the axial rotation of the extension member, and wherein axial rotation of the hollow extension member in a first direction engages the guide with the opening to prevent slidable movement of the hollow extension member relative to the hollow member, and wherein axial rotation of the extension member in a second direction disengages the guide from the opening into a first right angle interior corner of the substantially square cross-sectional profile of the hollow member to permit slidable movement of the hollow extension member relative to the hollow member.

13. The vehicle to be towed as claimed in claim 12, wherein the vehicle to be towed is a trailer.

\* \* \* \* \*